United States Patent [19]
Steinbach

[11] 3,982,846
[45] Sept. 28, 1976

[54] TOOL DEVICE
[76] Inventor: Ralph L. Steinbach, 2347 Gaston Ave., White Bear Lake, Minn. 55110
[22] Filed: Jan. 31, 1975
[21] Appl. No.: 545,981

Related U.S. Application Data
[63] Continuation of Ser. No. 421,922, Dec. 5, 1973, abandoned.

[52] U.S. Cl. .............................. 408/226; 269/62; 408/230; 408/240
[51] Int. Cl.² ........................................ B23B 51/02
[58] Field of Search .......... 408/226, 229, 230, 239, 408/239 A, 240, 199; 279/62

[56] References Cited
UNITED STATES PATENTS
2,468,874  5/1949  Hawkins ............................ 408/226
3,608,400  9/1971  Mortensen ..................... 408/199 X Primary Examiner—Othell M. Simpson
Assistant Examiner—Z. R. Bilinsky
Attorney, Agent, or Firm—Frederick E. Lange

[57] ABSTRACT

A tool device in which a torsion tool such as a drill bit is provided with oppositely disposed flanges of such size and shape that the jaws of the chuck press against the sides of the flanges while all three jaws tend to engage and clamp the shank of the tool, so that the chuck may be manually tightened and loosened. Where the jaws of the chuck are not cut away but form a solid cylinder when engaged with each other, the flanges can be of such size and shape to be engaged by two of the jaws while allowing all three jaws to engage the shank of the tool without substantial flexing of the flanges. Where the jaws are cut away so that their clamping portions do not meet when the jaws are brought together, the flanges may be more flexible to ensure that all three jaws engage the shank of the tool.

2 Claims, 8 Drawing Figures

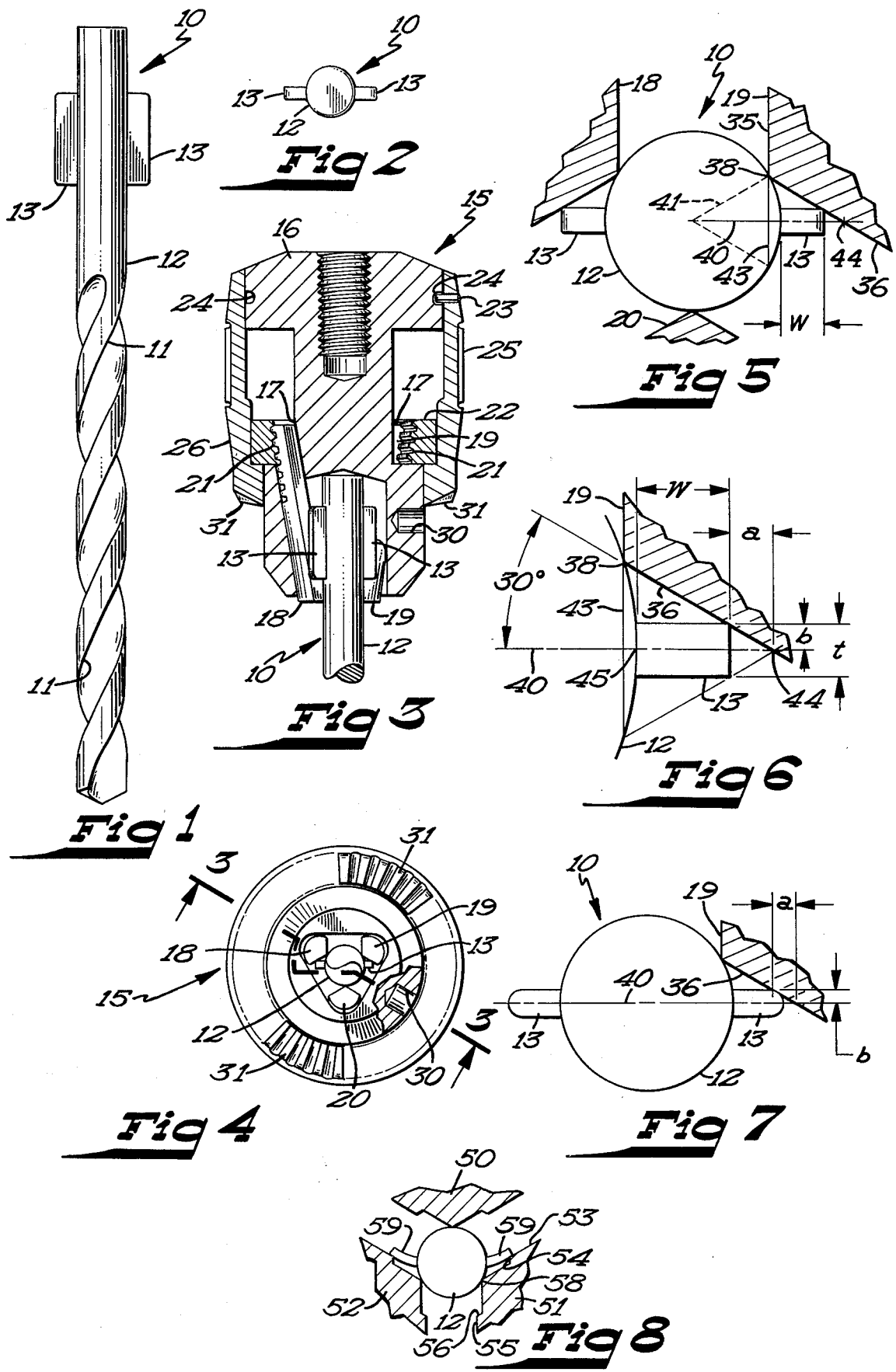

TOOL DEVICE

This is a continuation of application Ser. No. 421,922, filed Dec. 5, 1973 now abandoned.

BACKGROUND OF THE INVENTION

There are many torsion type tools in which there is a shank and a tool portion and the shank is inserted into a chuck having jaws which are clamped against the shank of the tool. A typical tool of this type is the ordinary twist drill which is inserted into a three-jaw chuck, often of the so-called "Jacobs" type. The difficulty with this type of tool device including a chuck and a torsion tool is that unless the chuck is tightened by some sort of tightening device, there is a tendency for the tool to slip with respect to the chuck. As a result, it is very common to employ some sort of mechanical device for tightening the chuck. This device cannot be left in the chuck while it is rotating. Consequently, it is necessary to provide for some means for retaining the tightening device conveniently accessible. It is obviously desirable to have an arrangement in which the chuck need merely be tightened manually. Attempts have been made in the past to provide such an arrangement. Normally, such attempts have taken the form of some sort of projections or flanges on the shank of the tool to prevent relative rotation between the tool and the chuck. The difficulty with prior arrangements is that they either have required a special chuck or that the lugs or flanges have not been retained against rotation in both directions with respect to the chuck so that the chuck still must be tightened as much as has been necessary with conventional tools if slippage of the tool with respect to the chuck is to be prevented. It is obviously desirable, if the tool is to be held firmly, that the flange or flanges be clamped to prevent relative movement of the tool and the chuck. At the same time, it is also desirable that the jaws of the chuck directly clamp the stem of the tool so that the stem is held in a position where it is coaxial with the chuck. It is also obviously desirable that the arrangement employ a standard chuck since a high percentage of those purchasing drill bits or similar torsion type tools already have a drill or similar device with which the tool is to be used.

SUMMARY OF THE INVENTION

The present invention is concerned with an arrangement in which the torsion tool has oppositely disposed flanges which are of such size and character that they are clamped by two jaws of a standard three-jaw chuck while all three jaws are in clamping engagement with the shank of the tool. Where the chuck is of the type in which the three jaws come together and form a solid cylinder when together, it is possible to have the flanges so designed that they can be relatively rigid and clamped by two of the jaws while not interfering with the simultaneous engagement of all three jaws of the drill. In other words, two of the jaws firmly engage the flanges with a wedging action and, with very little flexing of the flanges, all three jaws can be brought into clamping engagement with the shank of the tool. This type of jaw construction is commonly employed with quarter-inch drills.

Often, however, due to portions of the jaws being cut away to permit the use of larger drills, or for other reasons, the jaws do not simultaneously engage the shank of the tool and the flanges, even with slight flexing of the flanges. While in theory it would be possible to design the flanges to accommodate jaws of any type, this would require the dealer to carry a large variety of tools, such as drills. Furthermore, it would require the maintenance of such close tolerances as to make the tools unduly expensive. An alternative arrangement contemplated is to make the flanges relatively flexible. Thus, as the jaws are tightened and two of the jaws engage the flanges, it is possible to continue tightening the jaws to cause them all to engage the shank portion of the tool, this continued tightening being made possible by flexing of the flanges.

Where the tool is to be used with a chuck of the type commonly employed with quarter-inch drills, that is a chuck in which the walls of each jaw are disposed at an angle of 120° with respect to each other and in which when the jaws are brought together they collectively form a solid cylinder, it is desirable that the effective width of the flanges between the cylindrical shank and the jaw engaging portions is as close as possible to $$(\sqrt{3}-1)R - \sqrt{\frac{3}{2}t}$$

where R is the radius of the shank and $t$ is the thickness of the flange at the jaw engaging portion most widely spaced from the shank. A tool of this type, when inserted into such a chuck, will always result in the flanges of the tool being wedged by two adjacent jaws at the same time that the jaws are clamping the cylindrical shank.

Other objects and features of the invention will be apparent from a consideration of the accompanying specification, claims and drawing.

BRIEF DESCRIPTION OF THE DRAWING

FIG. 1 is an elevational view of a twist drill in accordance with our invention;

FIG. 2 is a top plan view of the drill of FIG. 1;

FIG. 3 is a vertical sectional view taken along the line 3—3 of FIG. 4 showing our improved tool device including our improved tool with the tool being clamped in the chuck of the tool device;

FIG. 4 is a bottom plan view of the chuck of FIG. 3 with the tool device in position;

FIG. 5 is a schematic view on a larger scale showing the relationship of the flanges of the tools of FIGS. 3 and 4 with respect to the jaws of the chuck;

FIG. 6 is a detailed view on a larger scale showing the mathematical relationship between the thickness of the flange and the radius of the drill;

FIG. 7 is a view similar to FIG. 6 with a modified form of flange in which the ends are rounded off; and FIG. 8 is a sectional view similar to FIG. 5 but in which the jaws are recessed adjacent their gripping portions and in which the flanges are flexible to permit engagement of the jaws with the shank while clamping the two flanges.

DESCRIPTION OF THE PREFERRED EMBODIMENT

Referring to FIG. 1, the tool device 10 is shown as a twist drill having the usual helical cutting edges 11 and a shank portion 12, which shank portion is designed for insertion into a conventional type of chuck. Our invention resides in the provision of two flanges 13 which, as will be pointed out, are of such character that they are clamped by two of the jaws of the chuck while the three jaws simultaneously engage the shank 12.

Referring to FIG. 3, the tool device is shown as comprising a chuck 15 in which is clamped the shank 12 of the drill 10. FIG. 4 shows an end plan view of the chuck with the drill 10 clamped therein.

As is common with chucks used in drills, there is a chuck body or housing 16 which has a threaded recess to enable the chuck body to be secured to some driving means such as the driving mechanism of the usual motor operated drill. The housing 16 has three inclined passages 17 in which are disposed the jaw members 18, 19 and 20. Because of the passages 17 being inclined, it will be obvious that, referring to FIG. 3, if the jaws are moved downwardly, they will converge towards each other and if moved upwardly, they will move apart from each other. Any of various arrangements may be employed for moving the jaws 18, 19 and 20 upwardly and downwardly. In a typical chuck, the jaws 18, 19 and 20 are provided on the outer surfaces of their upper portions with rack teeth 21 which threadedly engage with the internal conically disposed threads of a nut 22 which is nonrotatably secured in any suitable manner within a sleeve 26. The sleeve 26 is rotatably secured to the housing 16, being held against longitudinal movement by a pin 23 which extends through the sleeve 26 and extends into an annular groove 24 extending around the outer periphery of the upper portion of housing 16. The sleeve 26 preferably has an intermediate knurled portion 25 which enables the sleeve to be gripped by hand and rotated. It will be obvious that upon rotation of sleeve 26 and the resulting rotation of the nut 22, the jaw members 18, 19 and 20 will be moved inwardly or outwardly. If the sleeve is rotated in one direction, the jaws 18, 19 and 20 will be moved downwardly and together to clamp the shank of a drill disposed therein. If the sleeve 26 is rotated in the opposite direction, the jaws 18, 19 and 20 will be moved upwardly to separate the jaws and loosen them from the shank of a drill disposed therein. The sleeve 26, as far as the present invention is concerned, can be adequately tightened by hand due to the action of the flanges 13. Such chucks are, however, commonly provided with a plurality of openings 30 for the reception of a key device having annular teeth which cooperate with an annular rack 31 formed in the lower portion of rotatable sleeve 26. By inserting such a key into one of the openings 30 and engaging the teeth of the key with the teeth of the rack, it is possible by the rotation of the key to apply considerable force to the sleeve 26 and hence to tighten the jaws 18, 19 and 20 against the shank of the tool 10. As explained, however, it is unnecessary with our drill to use such a key and it is possible to adequately tighten the jaws against the shank by manual rotation of the sleeve 26.

As shown in FIGS. 4 and 5, the jaws 18 and 19 engage not only one outer corner of each of the flanges 13 but also the shank 12 of the tool 10. At the same time, the jaw 20 engages the shank 12 of the tool. Thus, not only is the shank 12 clamped in place in the conventional manner between three jaws 18, 19 and 20 but it is also held against rotation by reason of the side walls of jaws 18 and 19 pressing against the corners of flanges 13. Fundamentally, what now happens is that the engagement of jaws 18, 19 and 20 with the shank 12 is primarily for positioning of the shank coaxially with the chuck. The jaws 18, 19 and 20 are no longer required to prevent rotation of the shank 12 when a load is applied to the tool portion of the tool 10. This function is performed by the clamping action of the jaws 18 and 19 against the two flanges 13. In view of this, it is no longer necessary to tighten the jaws 18, 19 and 20 as tightly against the drill 12 as is normally required where there are no flanges. Furthermore, because both flanges 13 are engaged by the jaws, the tool cannot be rotated in either direction. It thus becomes possible to firmly hold the drill in place by merely manually tightening the jaws against the tool by rotation of the sleeve 26.

In the type of chuck commonly employed in one-quarter inch drills, the jaws 18, 19 and 20 are of the type shown in FIGS. 4 and 5 in which the jaws each have their walls disposed at an angle of 120° with respect to each other and in which the jaws form a solid cylinder when brought together. With this type of chuck, it is possible to make the flanges 13 of such length and width that they engage the jaws 18 and 19 at the same time that the jaws 18, 19 and 20 engage the shank 12 of the tool 10. Furthermore, under these conditions, this can be accomplished with relatively little flexing of the flanges 13. We have found that this condition exists when the effective width W of the flanges between the cylindrical shank and the jaw engaging portions is substantially:

$$(\sqrt{3}-1)R - \sqrt{\frac{3}{2t}} \qquad (1)$$

where $R$ is the radius of the cylindrical portion of the shank and $t$ is the thickness of the flange at the jaw engaging portion most widely spaced from the shank. The manner in which this formula is derived can best be understood by reference to FIGS. 6 and 7 which show two forms of flanges. FIG. 6 shows on a very much enlarged scale a drill employing a rectangular flange 13 and the formula referred to above will be developed first in connection with that figure and FIG. 5. Each jaw 18, 19 and 20 has two converging walls which are disposed at an angle of 120° with respect to each other. Considering jaw 19, for example, this jaw has two walls 35 and 36 which meet to form a line 38 which constitutes the shank engaging portion of the jaw. If one now draws a line 40 through the center plane of flange 13 and the center of shank 12, and if one draws another line 41 between the point of engagement of line 38 with shank 12 and the center of the shank 12, there are now two congruent right triangles. One of these has as its hypotenuse the line 41 and the other the wall 36 of jaw 19. The angle between the hypotenuses 40 and 41 and the base line 40 is 30° in each case. It will furthermore be observed that the hypotenuse 41 is equal to the radius R of the shank 10. Similarly, the hypotenuse of the other triangle as measured between line 38 and the intersection of wall 36 with line 40 is likewise equal to R. The distance between line 43 and point 44 measured along line 40 is equal to R cosine 30° or $\sqrt{3/2}$ R. The distance along line 40 between the center of shank 12 and point 44 is twice this distance, or, $\sqrt{3}$ R. The distance between point 45 at which the flange 13 meets the stem 12 and point 44 is equal to the distance just mentioned minus the radius R. In other words, this distance is equal to:

$$(\sqrt{3}-1)R.$$

If the flange 13 were a triangular flange, the desired length for this flange would thus be ($\sqrt{3}-1$)R. Actually, the end of the flange is not triangular. In the example shown in FIGS. 4, 5 and 6, the flange is rectangular. It will be noted that another 30° triangle is formed by the wall 36, the end of the flange 13 and the portion of line 40 projecting beyond the flange. The vertical wall of this triangle has a height of $1/2t$ where $t$ is the thickness of the flange. Since the angle between wall 36 and line 40 is 30°, the distance between the end of the flange 13 and point 44 is $1/2t$ times the cotangent of 30° which is equal to:

$$\sqrt{3}\,(1/2t). \qquad (2)$$

Thus, applying the formulas 1 and 2 and using the term W to represent the width of the flange between the shank 12 and the point of engagement with the jaw 26:

$$W = (\sqrt{3}-1)R - \sqrt{\frac{3}{2}}\,t\,. \qquad (3)$$

The same formula will hold true if the flange is rounded at the end, for example. In this case, as illustrated in FIG. 7, it is possible that the engagement of the flange with the wall 36 of the jaw does not take place at the thickest point of flange 13 but rather on a rounded end portion of the flange. In this case, the formula still holds provided that $t$ in this case is the thickness of the flange at the point where it engages the jaw.

Since the jaw is a flat surface disposed at 120°, it is possible for the manufacturer of the drill or other torsion tool to know in advance how wide the flange should be depending upon the nature of the end surface of the flange. Thus, it is possible with any size shank to insure that simultaneous engagement of the shank with all three jaws and of both flanges with adjacent jaws takes place at the same time.

As pointed out above, the type of chuck shown in FIGS. 4, 5 and 6 is widely used and is almost universally used with ¼-inch shanks. While the relationship described is possible with drills of this type, it is commercially impossible to maintain the exact tolerances necessary to insure the relationship described above. Hence, in actual practice, some flexing of the flanges 13 or lateral shifting of jaws 18 and 19 in the chuck is necessary as the chuck is tightened before jaws 18 and 19 engage the shank of the tool.

Furthermore, with certain chucks, particularly those designed to handle larger shanks such as ⅜-inch shanks, the jaws are not necessarily as regular as jaws 18, 19 and 20 of FIGS. 4, 5 and 6. These jaws may be rounded at the end or they may have portions cut away as shown in FIG. 8. This permits the jaws for the same range of clamping movement to accommodate larger shanks. It is very unlikely that there will ever be any need of these being used with extremely small shanks. As is evident from FIG. 8, the three jaws 50, 51 and 52 are recessed adjacent their outer ends. Thus, referring to jaw 51, the wall 53 is recessed at 54. Similarly, the other wall 55 is recessed at 56. The result is that the stem engaging portion 58 at which the two recessed walls meet is disposed inwardly from the line at which walls 53 and 55 would meet if these walls were continued inwardly without being recessed. It will be readily apparent that the formula (3) developed above would no longer hold since this was predicated upon the walls being uninterrupted and forming a solid cylinder when brought together. Of course, even with this arrangement, the flanges 59 could be made in accordance with this formula if they were made sufficiently narrow that they would only engage the recessed portions. If, however, they engage the major walls of jaws 51 and 52, it is obvious that a flange designed in accordance with the formula above would not act as intended. Furthermore, if the jaws are rounded, the formula would not apply. To overcome this difficulty, the flanges 59 are made of somewhat thinner material so as to be more flexible than the flanges 13. The flanges may, for example, be formed of resilient material having its inner ends inserted into slots in the shank 12 and retained therein by any suitable means such as peening, welding or the like. As the three jaws 50, 51 and 52 are tightened together, and the walls of jaws 51 and 52 engage the flanges 59 before the shank engaging portions of the three jaws have clamped the shank 12, the flanges 59 yield inwardly, as shown in FIG. 8, to permit the three jaws 50, 51 and 52 to be brought into clamping engagement with shank 12. Again, one obtains the result of having all three jaws engage the shank 12 while the two flanges are firmly wedged by two of the jaws. As in the previous embodiment, the flanges act to prevent rotation of this shank whereas the engagement of the jaws with the shank acts to hold it coaxial with the chuck. As with the previous embodiment, it is possible to tighten the chuck manually since it is no longer necessary to tighten the jaws as much as is necessary where the engagement of the jaws with the shank must not only line up the shank coaxially with the chuck but must also prevent its rotation.

A further advantage of our present invention is that because the jaws of the chuck do not have to grip the shank as tightly as has been the practice, the drills or other torsion tools are not indented as much. When a key is employed to tighten up a conventional chuck, the jaws tend to bite into the shank slightly. After the tool has been repeatedly used, there are a series of longitudinal indentations. With our tool, this tendency is materially reduced.

CONCLUSION

It will be seen that we have developed a tool device employing a conventional type of chuck and a tool in which the tool can be quickly secured on the chuck by merely clamping the chuck manually. It will furthermore be seen that this is accomplished without modification of the chuck. It will also be seen that we have developed a tool which is capable of use with any of various conventional chucks on the market. While we have shown certain specific embodiments for purposes of illustration, it is to be understood that the scope of the invention is to be limited solely by the appended claims.

We claim:

1. A tool device comprising a rotary chuck, said chuck having three similar pointed clamping jaws symmetrically disposed about the longitudinal axis of said chuck and clamping means for moving said jaws together towards said longitudinal axis, the walls of each jaw being disposed at an angle of 120° with respect to each other so that when said jaws are brought together they collectively form a solid cylinder, and a torsion tool secured in said chuck and having a tool portion at one end and a cylindrical shank portion at its other end, said cylindrical shank portion being disposed in said chuck coaxially therewith between said jaws and clamped thereby, said shank portion having a basically uniform circular cylindrical cross-section and two flanges projecting outwardly therefrom opposite to each other, the effective width of the flanges between the cylindrical shank and the portions of the flange engaged by the adjacent jaw being $$(\sqrt{3}-1)R - \sqrt{\frac{3}{2}}t$$

where $R$ is the radius of the cylindrical portion of the shank and $t$ is the thickness of the flange at the jaw engaging portion most widely spaced from the shank so that upon normal hand tightening of said clamping means two of the jaws firmly engage the two flanges while all three jaws tend to engage the cylindrical shank portion.

2. A torsion tool comprising a body having a tool portion at one end and a cylindrical shank portion at its other end, said cylindrical shank portion being designed to be inserted in and engaged by a rotary three-jaw chuck of the type in which the jaws are pointed and the walls of each chuck are disposed at an angle of 120° with respect to each other so that when said jaws are brought together they collectively form a solid cylinder, said shank portion of said tool having a basically uniform cylindrical cross-section and having two radially extending flanges projecting outwardly therefrom opposite to each other and terminating prior to said tool portion, said two flanges of said shank portion having portions designed to be engaged by the jaws of the chuck and in which the effective width of the flanges between the cylindrical shank and the jaw engaging portions is substantially $$(\sqrt{3}-1)R - \sqrt{\frac{3}{2}}t$$

where $R$ is the radius of the cylindrical portion of the shank and $t$ is the thickness of the flange at the jaw engaging portion most widely spaced from the shank so that when the shank portion is inserted into such a chuck and the clamping jaws are tightened against the shank, two of the jaws firmly engage the two flanges while all three jaws firmly engage the cylindrical portion of the shank without need for flexing of the flanges.

* * * * *